Patented Sept. 8, 1936

2,053,360

UNITED STATES PATENT OFFICE 2,053,360

METHOD OF MANUFACTURING ABRASIVE COATED ARTICLES

Raymond C. Benner and Romie L. Melton, Niagara Falls, N. Y., assignors to The Carborundum Company, Niagara Falls, N. Y., a corporation of Pennsylvania No Drawing. Application December 23, 1933, Serial No. 703,831

11 Claims. (Cl. 91—70)

This invention relates to the manufacture of abrasive coated articles such as paper, cloth, fiber, metal and the like. More particularly the invention relates to methods of applying abrasive material to such articles.

According to the present invention, abrasive grains coated with films of bonding material are applied to a suitable backing such as paper or cloth, and the films are then treated to cause them to adhere to the backing; securely fastening the abrasive grains to the backing.

The films coating the abrasive grains may consist of bonding materials such as glue, lacquer, resins, cellulose compounds, and mixtures of resins and the oxidation products of drying oils such as tung and linseed oil, which are soluble in suitable solvents, or heat-hardenable bonding materials, such as certain resins marketed under the trade name "Redmanol", or thermoplastic bonding materials such as shellac.

In applying the abrasive grains to the backing of paper or cloth the sheet or web may be carried on suitable rollers through a zone in which the coated abrasive grains are distributed over the surface of the web to a desired concentration. The distribution of the grains on the web can be accomplished by the use of the usual feed hopper and distributing roll, which are well known in the art.

After the application of the coated grains the web passes to a second zone in which the films of bonding material are caused to soften and adhere to the web or backing material.

The web is then passed into a third zone where the bonding material is caused to harden in position around the bases of the grains to securely bind each grain to the web or backing.

In accordance with the nature of the bonding material on the grains the character of the treatment accorded the films in the second and third zones mentioned above, will be varied.

When the abrasive grains coated with films of soluble bonding material are used, the second zone of treatment, mentioned above, will include suitable means for the application of a solvent, such as for example, a very fine spray. This solvent will soften the individual films and cause them to flow down around the bases of the grains, as described above. For this type of film, the third zone comprises means to evaporate the solvent and cause the bonding material to harden or set, fastening the grains to the backing; for example, a heated gaseous medium.

With abrasive grains coated with films of heat-hardenable material the second zone may involve the application of a suitable solvent, as described above, or heat may be used to soften the films of bonding material sufficiently to cause a desired adhesion to the backing. Such heating means may consist of radiant heating members or a gaseous medium heated to the proper temperature. The third zone comprises means for heating the films to a temperature sufficiently high to complete the curing of the bonding material. Such heat may be applied by any of the usual methods such as for example, a heated gaseous medium, radiant heat from suitable heaters or heat applied directly to the back of the coated web. Moreover, jets of heated gas may be directed at the surface of the web, in the third zone of treatment, to force the films from the tops of the grains toward their bases; and cure or assist in curing the films of bonding material.

When abrasive grains, coated with films of thermoplastic bonding material are used, the web may be moved after application of the grains, into a zone wherein heat is applied to soften the films, whereby they will flow downward to the bases of the grains. This second zone may comprise a heated gaseous medium, or jets of heated gas may be utilized, as above. For this type of bonding material, the third zone will involve means to cool the films so as to harden them in position around the bases of the grains. For example, the third zone may comprise a suitable refrigerating means.

When solvent material is used to soften the films, it is desirable to provide a solvent recovery system in connection with the third zone, wherein such solvents are evaporated. The gaseous medium from this third zone may be circulated through such a solvent recovery system and returned for re-use.

Because of vibration, it is sometimes desirable to treat the web just before the application of the abrasive grains so as to prevent uneven redistribution of the grains before they reach the second zone of treatment. For example, a coating of adhesive material may be applied to the web; of such quantity to merely retain the grains in position as deposited until the films on the grains soften and flow downward around the bases of the grains. The coating necessary in this instance is not enough to seriously impair the flexibility of the finished article.

An alternative means of preventing redistribution of the abrasive grains, which are coated with solvent soluble bonding material, involves the application of a small quantity of solvent to the web immediately prior to the application of the grains. This solvent softens the film of each grain at the point of contact with the web sufficiently to make it adhere in place unaffected by the vibrations.

Another method, which is particularly adaptable to thermoplastic resins, involves heating the uncoated backing material to a temperature sufficient to soften the resin film and render it adhesive. In this case the coated granules become adhesive immediately after deposition onto the backing material and any tendency of redistribution of the granules is eliminated.

The present invention provides a method of making abrasive coated articles which is much simpler than previous methods and comprises fewer operations. Each grain is supported by a hardenable bonding material which is built up around the base of that particular grain, supporting it against lateral pressure as well as holding it to the backing. Coated abrasives made by this method may therefore be used without the sizing operation common in previous methods.

The character of the final disposition of the bonding material will depend upon the concentration of the grain on the backing. With dense coatings of abrasive grains the adhesive films may tend to unite between adjacent grains, but do not form a continuous film over the entire backing. With open coatings of grain, the adhesive films surrounding the grains are not likely to unite. In either case, the greater proportion of the bonding material is built up around each individual grain, thus affording maximum strength without decreasing the flexibility of the web. Abrasive coated paper or cloth of this character is more flexible than similar open coated papers produced by previous methods. With still less concentration of grains, the films of bonding material will touch, if at all, only at their edges and the resulting finished article will be open coated and quite flexible. Therefore it is possible to produce articles by this method which do not require flexing operations to render them suitable for use.

It is obvious that the present invention is capable of many modifications which do not depart from the spirit of this invention which is limited only by the claims.

We claim:

1. The method of making abrasive coated articles which consists in the essential steps of sprinkling loose abrasive grains having individual non-tacky films of a plasticizable binder onto a flexible moving web, plasticizing the said films whereby a portion of the binder on each grain flows to the base of said grain and into contact with the web, and hardening the said plasticized binder to cause the grains to adhere to the web, the films of binder on the grains being substantially all the binder applied to the article.

2. The method of making abrasive coated articles which consists in the essential steps of sprinkling loose abrasive grains having individual non-tacky films of a plasticizable binder onto a flexible moving web, subjecting the said grains to the action of a solvent for the binder to plasticize the films whereby a portion of the binder on each grain flows to the base of said grain and into contact with the web, and hardening the said plasticized binder to cause the grains to adhere to the web, the films of binder on the grains being substantially all the binder applied to the article.

3. The method of making abrasive coated articles which consists in the essential steps of sprinkling loose abrasive grains having individual non-tacky films of a plasticizable binder onto a flexible moving web, heating the said film to plasticize the binder whereby a portion of the binder on each grain flows to the base of said grain and into contact with the web, and solidifying the said plasticized binder to cause the grains to adhere to the backing, the films of binder on the grains being substantially all the binder applied to the article.

4. The method of making abrasive coated articles which consists in the essential steps of sprinkling loose abrasive grains having individual non-tacky films of a plasticizable binder onto a flexible moving web, plasticizing the said films whereby a portion of the binder on each grain flows to the base of said grain and into contact with the web, and heating the said plasticized binder to harden it and cause the grains to adhere to the web, the films of binder on the grains being substantially all the binder applied to the article.

5. The method of making abrasive coated articles which consists in the essential steps of sprinkling loose abrasive grains having individual non-tacky films of a plasticizable binder onto a flexible moving web, plasticizing the said films whereby a portion of the binder on each grain flows to the base of said grain and into contact with the web, and cooling the said plasticized binder to harden it and cause the grains to adhere to the web, the films of binder on the grains being substantially all the binder applied to the article.

6. The method of making abrasive coated articles which consists in the essential steps of sprinkling loose abrasive grains having individual films of a fusible heat-hardenable resinous binder onto a flexible moving web, plasticizing the said films whereby a portion of the binder on each grain flows to the base of said grain and into contact with the web, and hardening the said plasticized binder to cause the grains to adhere to the web, the films of binder on the grains being substantially all the binder applied to the article.

7. The method of making abrasive coated articles which consists in the essential steps of sprinkling loose abrasive grains having individual non-tacky films of a thermo-plastic resinous binder onto a flexible moving web, plasticizing the said films whereby a portion of the binder on each grain flows to the base of said grain and into contact with the web, and hardening the said plasticized binder to cause the grains to adhere to the web, the films of binder on the grains being substantially all the binder applied to the article.

8. The method of making abrasive coated articles which consists in the essential steps of forming a loose mass of abrasive grains having individual non-tacky films of a plasticizable binder, treating a flexible moving web to cause the coated grains to temporarily adhere thereto, sprinkling the said coated grains onto the said moving web whereby they temporarily adhere to the web and are maintained in place against vibration, plasticizing the said films whereby a portion of the binder on each grain flows to the base of said grain and into contact with the web, and hardening the said plasticized binder to cause the grains to adhere to the web, the films of binder upon the grains being substantially all the binder applied to the article.

9. The method of making abrasive coated articles which consists in the essential steps of preparing a loose mass of abrasive grains having individual non-tacky films of a plasticizable binder, applying a thin film of a solvent for the said binder to a flexible moving web whereby the grains temporarily adhere thereto, sprinkling the said grains onto the moving web on the solvent whereby they temporarily adhere to the web and are maintained in position against vibration, plasticizing the said films whereby a portion of the binder on each grain flows to the base of said grain and into contact with the web, and hardening the said plasticized binder to cause the grains to adhere to the web, the films of binder on the grains being substantially all the binder applied to the article.

10. The method of making abrasive coated articles which consists in the essential steps of producing a loose mass of abrasive grains having individual films of a plasticizable binder, heating a flexible moving web to cause the grains to temporarily adhere thereto, sprinkling the said grains onto the heated moving web whereby they temporarily adhere thereto and are maintained in position against vibration, plasticizing the said films whereby a portion of the binder on each grain flows to the base of said grain and into contact with the web, and hardening the plasticized binder to cause the grains to adhere to the web, the films of binder on the grains being substantially all the binder applied to the article.

11. The method of making abrasive coated articles which consists in the essential steps of forming a loose mass of abrasive grains having individual non-tacky films of a plasticizable binder, coating a flexible moving web with a thin film of adhesive, sprinkling the said grains onto the moving web on the adhesive, plasticizing the said films whereby a portion of the binder on each grain flows to the base of said grain and into contact with the web, and hardening the said plasticized binder to cause the grains to adhere to the web, the films of binder on the grains being substantially all the binder applied to the article.

RAYMOND C. BENNER.
ROMIE L. MELTON.